(No Model.) 2 Sheets—Sheet 2.
C. L. SAUNDERS.
MANUFACTURE OF CARBONS.
No. 598,646. Patented Feb. 8, 1898.
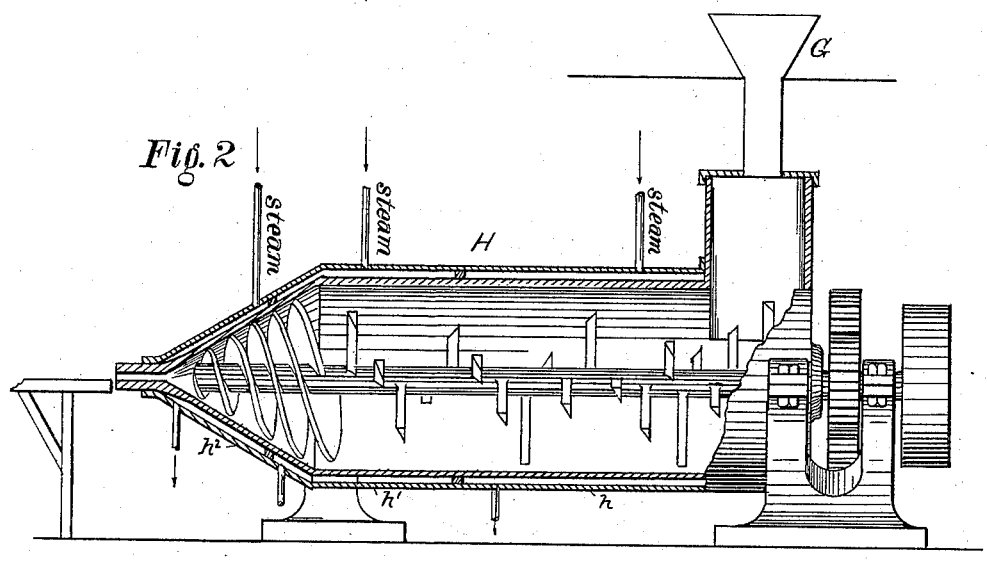
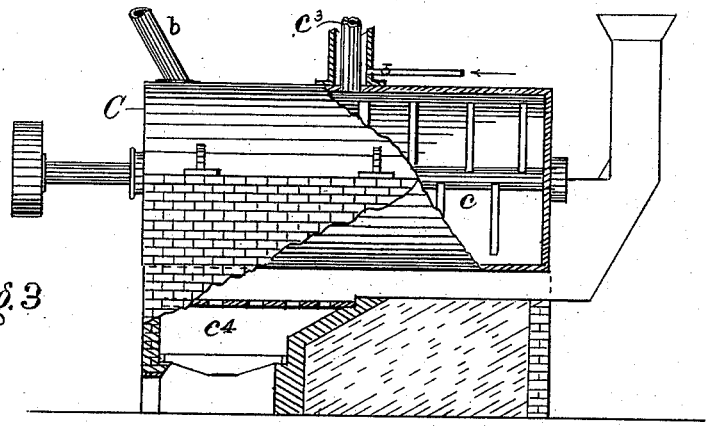
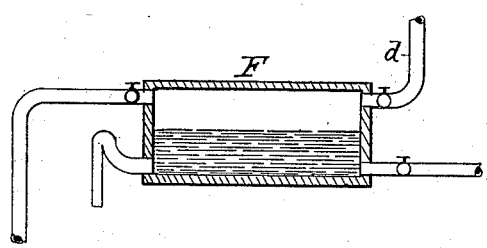
Witnesses
Myron B. Vorce.
H. B. Kavanaugh
Inventor
Cecil L. Saunders
By his Attorney

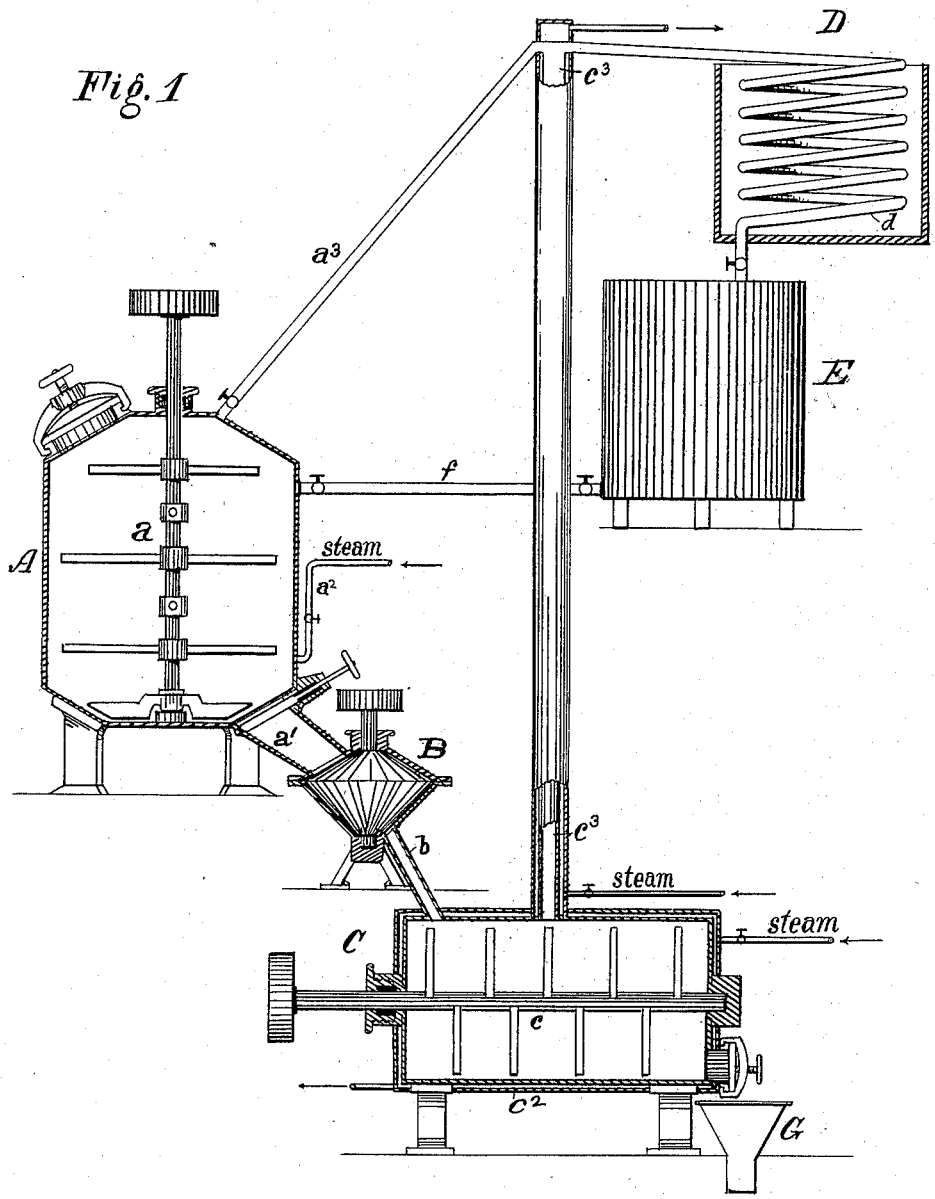

UNITED STATES PATENT OFFICE.

CECIL LORD SAUNDERS, OF CLEVELAND, OHIO.

MANUFACTURE OF CARBONS.

SPECIFICATION forming part of Letters Patent No. 598,646, dated February 8, 1898.

Application filed June 3, 1897. Serial No. 639,335. (No model.)

*To all whom it may concern:*

Be it known that I, CECIL LORD SAUNDERS, a citizen of the United States, residing at Cleveland, in the county of Cuyahoga and State of Ohio, have invented certain new and useful Improvements in the Manufacture of Carbons; and I do hereby declare the following to be a full, clear, and exact description of the invention, such as will enable others skilled in the art to which it appertains to make and use the same.

My invention relates to the manufacture of carbons for arc-light electrodes and other purposes. Its object is to reduce the cost of the manufacture and of the plant employed, to improve the quality of the manufactured product, and to relieve the process of manufacture of sundry objectionable features necessarily incident to the present method of manufacture; and it consists in the novel method of procedure hereinafter fully described.

My improved process is independent of any special machinery and may be carried out by any suitable mechanism adapted to the various operations hereinafter described, and, in fact, each step of the process is capable of application by means of various different forms of apparatus. In the drawings I have shown one form and arrangement of apparatus by which my improved process may be applied.

Figure 1 represents in elevation and partial section an efficient arrangement of apparatus for the preparation of molder's stuff, and Fig. 2 is a like representation of an apparatus for forming the carbons from the molder's stuff. Fig. 3 represents a modified arrangement of the distilling apparatus, and Fig. 4 represents a separator which may be used in certain cases.

A represents a macerator provided with an agitator $a$, this apparatus being in principle similar to an ordinary pug-mill or paper-pulp digester.

B represents a grinding-machine into which the macerator discharges and which is substantially like the common paint-mill in principle and mode of operation.

C represents a distilling-tank provided also with an agitator $c$ and heated either by a steam-jacket $c^2$ or by a furnace $c^4$, as shown in Fig. 3, or in any other suitable or preferred method of heating a still.

D represents a condenser in which the vapors driven off from the still through the vapor-pipe $c^3$ are condensed and from which they are returned to the storage-tank E, whence by gravity or by a suitable pump the liquid is returned through a pipe to the macerator A for a fresh charge.

All of the apparatus and connections are vapor-tight, so that the solvent never comes in contact with the air except when charged into the closed macerator. To expel any vapor of solvent remaining in the macerator after it is emptied of its charge, it is heated by a steam-jacket, or a steam-pipe $a^2$ is connected thereto and steam is blown in to fill the macerator, thus expelling the vapor of the solvent through the pipe $a^3$ to the condenser. Suitable valves are of course placed in the various pipes at any desired points.

For a more perfect understanding of the actual improvement effected by my invention in the manufacture of carbons for electrical purposes, I will first describe in a general way the process at present employed in that manufacture, presuming that the various steps of the process are usually conducted in separate departments, and usually in separate buildings, from one to the other of which the material in course of treatment has to be transported between each successive step.

The chief material of electrical carbons is, as is well known, the coke from petroleum-stills, to which is added as a binder a certain percentage of pitch and occasionally in some cases small amounts of other substances, as will be hereinafter described. Starting, therefore, with the "still-coke," so called, in the present process, the coke is first crushed, then calcined, then cooled, then ground, and then bolted or otherwise freed from all coarse particles. The pitch is ground, then sifted, and the finely-ground coke and pitch are intimately mixed by the aid usually of heat. The mixed material is then cooled and finally reground and sifted, when it constitutes what is known as "molders' stuff" and forms the material used in the subsequent steps of molding, baking, &c., by which the finished carbons are produced.

It will be observed that the present process above described involves nine distinct and separate operations or separate steps in the process, each not only involving large expense, but much time.

In distinction from the foregoing process I proceed in the following manner: I take the crushed coke resulting from the first step of the previously-described process, which, however, may be more coarsely crushed than in the present process described, or I take any form of carbon, as lampblack or graphite, and placing it cold in a suitable agitator, as A, which can be closed vapor-tight, I add a suitable solvent, for which purpose I employ a volatile carbon-compound liquid at atmospheric temperature and a solvent for hydrocarbons, resins, and soluble organic carbon compounds—such as benzol, carbon bisulfid, eucalyptol, dead-oil, &c.—and also add the proper proportion of pitch, tar, and oils and any desired ingredients such as are frequently added in the ordinary manufacture of carbons—such, for instance, as sulfuric acid, phosphates, cyanids, wax, or salts—such as those of sodium, calcium, strontium, lithium, cerium, tungsten, thorium, indium, boron, &c.—for increasing the brilliancy or luminosity of the arc or affecting the physical characteristics of the carbon. The mass is then agitated thoroughly, with the result that by the action of the solvent the coke becomes friable and soft, the pitch, &c., dissolves and, with the waxy hydrocarbons dissolved from the coke, forms a more or less thin solution, whose consistency depends, of course, upon the amount of solvent used. In practice an amount about sufficient to cover the solid material is added and produces a solution of about the thickness of syrup or molasses. The effect of such solution and agitation is to secure an absolute uniform blending of the ingredients, almost atomic in its nature, whereas the utmost endeavors to secure a uniform amalgamation and mixture of the ingredients by the method of dry mixing, as before described, have proved only approximately successful. When the agitation is finished, which ordinarily need not exceed about an hour's time, the slimy mixture is run out gradually from the agitator (continuing the agitation meanwhile) into a vapor-tight wet grinding apparatus, as B, of the nature of an ordinary paint-grinding mill, in which it is reduced to a smooth pulpy condition, like that of well-ground paint, and from which grinder it passes to a vapor-tight still, as C, provided with agitating-arms $c$ and with a vapor-pipe $c^3$, leading to a condensing-worm, as $d$. In the still the material is heated, either by steam or fire heat, to a temperature sufficient to evaporate out the solvent and all volatile extracted hydrocarbons which vaporize at moderate temperatures, say 150° to 250° Fahrenheit. The vapors so driven off are condensed in the worm and recovered for subsequent use. The material left by the removal of the volatile matters is a nearly or quite dry powder, which is evacuated from the still and cooled, when it constitutes the molder's stuff before referred to, and is molded into the desired form and baked in the same manner as if it had been prepared by the present process first described. It will thus be seen that the steps of my improved process are but four, viz: first, crushing the coke; second, macerating the materials with a solvent while agitating or stirring the mass; third, grinding the material wet; fourth, distilling off and recovering the solvent—in fact, that while retaining but two of the steps (the first and ninth) of the present process first described I have added but two new steps, thus completing in but four steps the work that formerly required nine. As a result I dispense with two sets of grinding machinery and sifting machinery, dispense with the calcining-retorts and the extensive gas-producers necessary for operating the same, as well as with the extensive cooling-floors and bolting apparatus. The macerating and distilling agitators are substantially equivalent to the mixing and conveying machinery formerly employed, and the power and heat used also about an equivalent for that formerly employed in mixing, so that substantially the entire fuel expense formerly involved in retorting or calcining the coke is saved.

From the condition of molder's stuff, as just above described, a branch or parallel method of manufacture is that known as "forcing" or "squirting" the carbon instead of molding and pressing it before baking. In this process, as ordinarily conducted, the molder's stuff is taken, a proportion of oil, tar, or ground pitch added, and the mass again mixed in the manner first described, after which, while still hot, it is by suitable machinery formed into plastic plugs, which are placed in a press-cylinder and by heavy pressure forced out through a die in the required form, and the carbons thus forced are then cooled and baked in the same manner that the molded carbons are baked.

By my improved process I dispense with the remixing and with the plug-forming when forced carbons are to be made, and by adding the required proportion of oil, tar, &c., in the first place and stopping the distillation at the proper point when the contents of the still are at the right consistency and temperature they are adapted to be at once transferred to the cylinder of the forcing-press and forced into the carbons of the required form. This may be done by discharging the stuff from the still C, as by means of a hopper G, directly into a forcing apparatus of the usual or any suitable kind, for which purpose the apparatus H (shown in Fig. 2) will be found efficient.

While I have described my improved process as applied to the treatment of still-coke, which is the material generally employed in the manufacture of carbons and which contains a small proportion of still-wax and undefined heavy hydrocarbons, which under high temperature act as binders for the fixed carbon, it is to be distinctly understood that I do not limit my invention to the use of such carbonaceous compounds as contain hydrocarbons, but include the use of graphite, lampblack, or other form of carbon not containing hydrocarbons, the essential and primary feature of my invention being the effecting of the necessary intimate and uniform mixture of the materials in a wet state by the use of some of the ingredients in liquid form instead of by mixing in the dry way. By this method I am enabled to retain the heavy, waxy, and undefined hydrocarbons generally classed in a group as "still-wax" and which when carbonized act as a binder for the originally-fixed carbon, but which in the ordinary process of calcining are in a large part driven off and lost. A secondary feature of my invention is, however, the extraction of the heavy waxy hydrocarbons from the coke by solution instead of by driving off the same by calcining. As a practical matter the aim and effort of carbon-manufacturers are to secure a coke as free as possible from hydrocarbons, so as to save as much as possible of the expense of calcining, the volatile hydrocarbons thereby driven off being a waste; but by my invention I am enabled to use a coke containing more than the usual amount of hydrocarbons, since all of it may, if desired, be extracted from the coke and recovered. To do this, I first macerate the crushed coke in the solvent without the addition of other matters and with or without agitation and draw off the solution, from which by ordinary distillation I recover the solvent and the still-wax or heavy hydrocarbon separately. The coke thus freed from the hydrocarbon may be ground and used in the ordinary way, before described, or I may add to it the pitch, oil, or other binder and a fresh quantity of solvent and proceed in the manner before described for the application of my process.

In the baking of the carbons a temperature is reached very much higher than is employed in calcining, and in this baking any traces of hydrocarbon not removed in the distillation are either driven off or cracked and converted into fixed carbon.

What I claim as my invention, and desire to secure by Letters Patent, is—

1. The hereinabove-described process of treating carbonaceous material to be used in the manufacture of carbons, which consists in mingling the carbonaceous material and a binder with a solvent for the binder and for the hydrocarbon elements of the carbonaceous material, grinding the mixture while wet, and then distilling off the volatile elements, substantially as described.

2. The hereinabove-described process of treating carbonaceous material to be used in the manufacture of carbons, which consists in mingling the carbonaceous material with a binder in liquid form, grinding the mixture while wet, and distilling off the volatile elements of the mixture, substantially as described.

3. The above-described process of treating carbonaceous material for use in the manufacture of carbons, which consists in mingling the carbonaceous material with a binder in the presence of a solvent for the binder, grinding the mixture while wet, and distilling off the solvent, substantially as described.

4. The above-described process of treating carbonaceous material for use in the manufacture of carbons, which consists in mingling the carbonaceous material with a binder dissolved in a solvent, grinding the mixture while wet, and distilling off the volatile elements of the mixture, substantially as described.

5. The above-described process of treating carbonaceous material for use in the manufacture of carbons, which consists in mingling the carbonaceous material with a binder dissolved in a solvent for hydrocarbons, grinding the mixture while wet, and distilling off the volatile elements of the mixture, substantially as described.

6. The above-described process of treating coke for the manufacture of carbons, which consists in mingling the coke with a binder soluble in a liquid carbon compound in presence of a carbon liquid solvent, then grinding the mixture while wet, and then distilling off the volatile elements of the mixture, substantially as described.

7. The hereinabove-described process for manufacturing carbons, which consists in mixing the carbonaceous material, binder and other substances with a liquid solvent for the binder, grinding the mass while wet, then distilling off the volatile elements, and then forming the carbons, substantially as described.

8. The hereinabove-described process for manufacturing carbons, which consists in mixing the carbonaceous material, binder and other substances by agitation with a liquid solvent for the binder, grinding the mass while wet, then distilling off the volatile elements, and then forming the carbons without cooling the material, substantially as described.

9. The process of treating carbonaceous materials for use in the manufacture of carbons, which consists in mingling the carbonaceous material with a liquid solvent for hydrocarbons, grinding the mixture while wet, and then distilling off the volatile elements of the mixture, substantially as described.

In testimony whereof I hereto affix my signature in presence of two witnesses.

CECIL LORD SAUNDERS.

Witnesses:
WALTER E. MORROW,
LOREN PRENTISS.